No. 846,309. PATENTED MAR. 5, 1907.
J. G. HORSEY.
LOCK.
APPLICATION FILED OCT. 18, 1905.
2 SHEETS—SHEET 1.
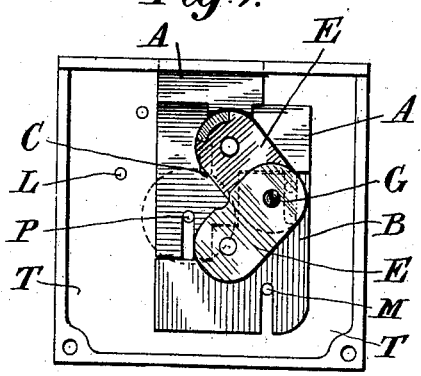
Fig. 1.
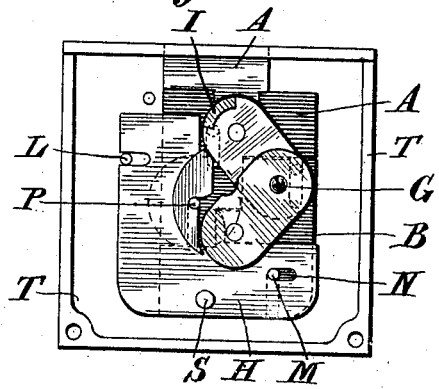
Fig. 3.
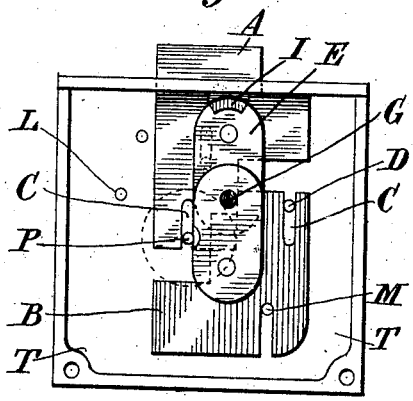
Fig. 2.
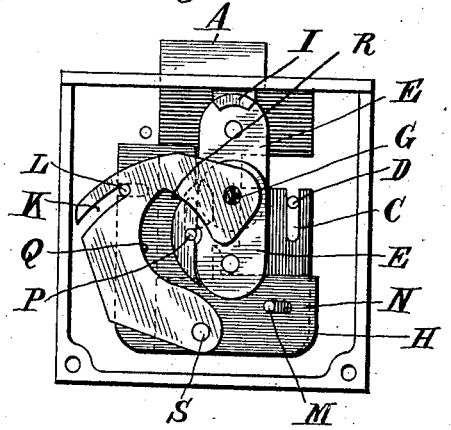
Fig. 4.
Witnesses:
Inventor
John G. Horsey
By
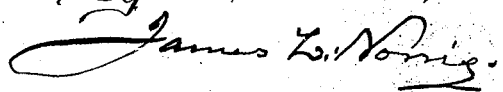
Atty.

No. 846,309. PATENTED MAR. 5, 1907.
J. G. HORSEY.
LOCK.
APPLICATION FILED OCT. 18, 1905.

2 SHEETS—SHEET 2.

Witnesses:

Inventor
John G. Horsey
By
Atty ced s
UNITED STATES PATENT OFFICE.

JOHN GEORGE HORSEY, OF SIDCUP, ENGLAND.

LOCK.

No. 846,309.  Specification of Letters Patent.  Patented March 5, 1907.

Application filed October 18, 1905. Serial No. 283,289.

*To all whom it may concern:*

Be it known that I, JOHN GEORGE HORSEY, a subject of the King of Great Britain, residing at Corcelles, St. Johns Road, Sidcup, Kent, England, have invented certain new and useful Improvements in Locks, of which the following is a specification.

The object of this invention is an improvement connected with locks whereby when the ordinary bolt is shot it is prevented from being forced back by a chisel, a "jimmy," or other appliance.

The principal features of this invention are connecting toggle-links to the bolt proper and to a movable section or half-bolt, which finds a bearing against the lock-casing or projections thereon, or other devices when the bolt is fully shot.

My invention will be clearly understood from the following description, aided by the accompanying drawings, in which—

Figure 5:
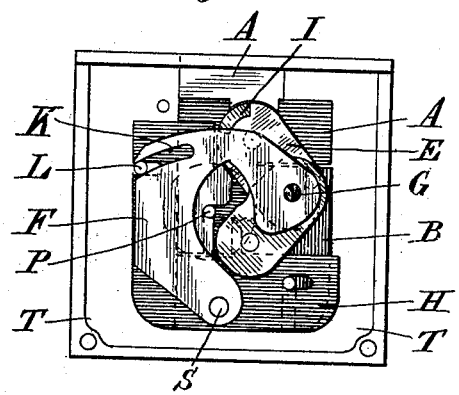
Figure 6:
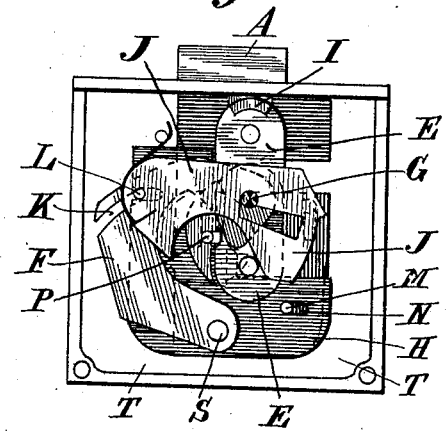

Figure 1 is an interior view of a lock, showing the two half-bolts and the toggle-links in the unlocked condition. Fig. 2 is a similar view in the locked condition. Fig. 3 is a similar view to Fig. 1 with the addition of the sliding plate. Fig. 4 is a similar view to Fig. 3, but in the locked condition and with the addition of the operating-lever. Fig. 5 is a similar view to Fig. 4, but in the unlocked condition. Fig. 6 is a view of a lock in the locked condition and showing the two half-bolts, sliding plate, operating-lever, and tumbler.

According to my invention I form the bolt in two parts or portions A B, guided by slots C and pins D, the two parts or portions A B being connected by toggle-links E, which are operated by a special-shaped lever F, one end of which is connected to the center pin G of the toggle-links E and the other end connected to a sliding plate H in such manner that when the special-shaped lever F is operated by the key the key imparts a crab-like action to the lever F to open out the toggle-links E to a straight line for shooting the bolt A or to contract the toggles E to draw back the bolt A. The toggles E may have a circular or other shoulder I for engaging a projecting portion of the bolt A. By this arrangement the key does not touch the bolt A itself. A number of spring-controlled tumblers J, preferably four, are provided with slots and gates, in which the center pin G of the toggle-links E engage in such manner as to lock the toggle-links in a straight line when the bolt A is shot after the key has actuated the slotted tumblers.

The operating-lever F is constructed of claw shape and is provided with a slot K for engaging a pin L to keep the lever F in the proper position, said pin L, together with pin M, having a position in slots N of the sliding plate H to insure proper movement of the sliding plate.

In action the key is inserted in the lock and over the pin P, which also acts as a guide to the bolt A, and on turning the key to lock or shoot the bolt to the locked position the key will first act upon tumblers J and place them in position for the gates to be in register in the well-known manner, and while holding the tumblers J in register the key will act on the edge Q of the operating-lever F and force over the operating-lever, the pin G riding along the slots of the tumblers J and drawing the toggle-links to a straight position, as at Fig. 6, the other gates of the tumblers engaging the pin G to hold the toggle-links firmly in the straight position, the toggle-links during the movement projecting the bolt A into locked position. A reverse movement of the key will operate the tumblers J in the same manner and acting against the face R of the lever F will contract the toggles and effect a reverse movement of the bolt A and pin G.

The lever F is pivoted at S to the sliding plate H and the movements of the sliding plate and the half-bolt B take place during the operation of the key and allow of perfect freedom of movement of the pin G and toggle-links, which would not otherwise be the case.

In some cases the sliding plate H can be dispensed with and the pin S located in a slot of the casing T.

What I desire to secure by Letters Patent is—

1. In a lock, the combination with a bolt comprising a plurality of members and toggle-connecting means, of a sliding plate, and a slotted operating-lever connected to said plate and toggle connections.

2. In a lock, the combination with a bolt comprising a plurality of members and toggle-connecting means, of a sliding plate, and an operating-lever having key-engaging means connected to said plate and toggle connections.

3. In a lock, the combination of a bolt comprising a plurality of members having interfitting projections, and connecting means for said members comprising pivotal links adapted to be fitted into alinement with each other when the bolt is actuated.

4. In a lock, the combination of a bolt comprising a plurality of members having interfitting projections and guide means, and connecting means for said members including pivotal links adapted to be shifted into alinement with each other when the bolt is in a locked position.

5. In a lock, the combination of a bolt comprising a movable member and a stationary member, toggle-connecting links, said links being in alinement with respect to each other when the bolt is in thrown position, and a slide-plate in operative relation with said bolt and toggle connection.

6. In a lock, the combination of a bolt comprising a plurality of members and toggle-connecting means including pivotal links adapted to be shifted into alinement with each other when the bolt is in a locked position, a sliding plate, and an operating-lever connected to said plate and toggle connection.

7. In a lock, the combination with a bolt comprising a plurality of members and toggle-connecting means, of a sliding plate, and a slotted operating-lever having key-engaging means connected to said plate and toggle connection.

8. The combination with a bolt comprising a plurality of members, toggle-connecting means for said members, a sliding plate carried by one of said members and having pivotally mounted thereon an operating-lever, and a plurality of spring-controlled tumblers in operative relation therewith.

In testimony whereof I have hereunto set my hand in presence of two subscribing witnesses.

JOHN GEORGE HORSEY.

Witnesses:
RICHARD CORE GARDNER,
HENRY MARLOW.